US012039388B2

(12) United States Patent
Forster

(10) Patent No.: US 12,039,388 B2
(45) Date of Patent: Jul. 16, 2024

(54) TUNING BLOCK METHODS AND SYSTEMS FOR USE WITH REACTIVE STRAPS

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 135 days.

(21) Appl. No.: 17/789,297

(22) PCT Filed: Dec. 28, 2020

(86) PCT No.: PCT/US2020/067210
§ 371 (c)(1),
(2) Date: Jun. 27, 2022

(87) PCT Pub. No.: WO2021/134074
PCT Pub. Date: Jul. 1, 2021

(65) Prior Publication Data
US 2022/0391655 A1 Dec. 8, 2022

Related U.S. Application Data

(60) Provisional application No. 62/954,474, filed on Dec. 28, 2019.

(51) Int. Cl.
*G06K 19/07* (2006.01)
*G06K 19/077* (2006.01)

(52) U.S. Cl.
CPC ... *G06K 19/0726* (2013.01); *G06K 19/07767* (2013.01); *G06K 19/07794* (2013.01)

(58) Field of Classification Search
CPC ......... G06K 19/0726; G06K 19/07767; G06K 19/07794; G06K 19/07756
See application file for complete search history.

(56) References Cited

U.S. PATENT DOCUMENTS 4,792,965 A * 12/1988 Morgan .................. H04B 5/00
340/870.31
5,491,715 A 2/1996 Flaxl
(Continued)

FOREIGN PATENT DOCUMENTS

CN 206289207 U 6/2017
DE 10357467 6/2005
(Continued)

OTHER PUBLICATIONS

International Search Report and Written Opinion dated May 7, 2021 issued in corresponding IA No. PCT/US2020/067210 filed Dec. 28, 2020.
(Continued)

*Primary Examiner* — An T Nguyen

(57) ABSTRACT

In some embodiments, an RFID device includes a reactive strap having an RFID chip and a conductive ring connected to the RFID chip. The RFID device may further include an antenna configured to be coupled to the reactive strap, and a tuning block set positioned in the vicinity of the reactive strap, a resonant frequency of the RFID device being determined at least in part by at least one of the shape of the tuning block set and the position of the tuning block set relative to at least the reactive strap.

19 Claims, 10 Drawing Sheets

(56) References Cited

U.S. PATENT DOCUMENTS

| | | | |
|---|---|---|---|
| 6,163,260 | A | 12/2000 | Conwell et al. |
| 6,294,998 | B1 | 9/2001 | Adams et al. |
| 6,407,669 | B1* | 6/2002 | Brown ............... G08B 13/244 340/572.1 |
| 7,158,033 | B2 | 1/2007 | Forster |
| 7,333,061 | B2 | 2/2008 | Liu et al. |
| 7,551,141 | B1 | 6/2009 | Hadley et al. |
| 7,954,228 | B2 | 6/2011 | Kobayashi et al. |
| 8,462,052 | B2 | 6/2013 | Yamagajo et al. |
| 9,087,282 | B1 | 7/2015 | Hyde et al. |
| 9,412,061 | B2 | 8/2016 | Forster |
| 9,812,782 | B2 | 11/2017 | Finn et al. |
| 10,311,351 | B1 | 6/2019 | Diorio et al. |
| 10,331,933 | B2 | 6/2019 | Li et al. |
| 10,373,045 | B2 | 8/2019 | Forster |
| 2004/0177492 | A1 | 9/2004 | Eckstein et al. |
| 2005/0093678 | A1 | 5/2005 | Forster et al. |
| 2005/0221704 | A1 | 10/2005 | Conwell et al. |
| 2006/0037502 | A1 | 2/2006 | Warther |
| 2006/0044769 | A1 | 3/2006 | Forster et al. |
| 2006/0237544 | A1 | 10/2006 | Matsuura et al. |
| 2006/0290512 | A1 | 12/2006 | Shanton |
| 2007/0182566 | A1 | 8/2007 | Kim et al. |
| 2007/0210924 | A1 | 9/2007 | Arnold et al. |
| 2007/0240304 | A1 | 10/2007 | Eisenhardt et al. |
| 2007/0283556 | A1 | 12/2007 | Wehr |
| 2008/0024276 | A1 | 1/2008 | Volpi et al. |
| 2008/0068176 | A1 | 3/2008 | Azuma et al. |
| 2008/0150719 | A1 | 6/2008 | Cote et al. |
| 2009/0002130 | A1 | 1/2009 | Kato |
| 2009/0109002 | A1 | 4/2009 | Hadley et al. |
| 2009/0164954 | A1 | 6/2009 | Yamagajo et al. |
| 2009/0273474 | A1 | 11/2009 | Nonaka |
| 2010/0051703 | A1 | 3/2010 | Kobae |
| 2010/0052859 | A1* | 3/2010 | Lossau ............... H01Q 7/00 343/729 |
| 2010/0123553 | A1* | 5/2010 | Banerjee ............... H01Q 9/30 343/747 |
| 2011/0063184 | A1* | 3/2011 | Furumura ........ G06K 19/07783 343/856 |
| 2012/0085672 | A1 | 4/2012 | Gelardi et al. |
| 2015/0278675 | A1 | 10/2015 | Finn et al. |
| 2018/0123220 | A1 | 5/2018 | Forster |
| 2018/0211499 | A1 | 7/2018 | Forster |
| 2019/0180158 | A1* | 6/2019 | Yase ............... G06K 19/0712 |
| 2019/0205714 | A1 | 7/2019 | Forster |
| 2019/0208636 | A1 | 7/2019 | Kato |
| 2019/0385039 | A1 | 12/2019 | Dyche |
| 2020/0184300 | A1 | 6/2020 | Forster |
| 2022/0391655 | A1* | 12/2022 | Forster ............. G06K 19/07767 |

FOREIGN PATENT DOCUMENTS

| | | |
|---|---|---|
| EP | 1717904 | 11/2006 |
| EP | 1865574 | 12/2007 |
| JP | 2002-321725 | 11/2002 |
| JP | 2003-99719 | 4/2003 |
| JP | 2003-224415 | 8/2003 |
| JP | 2004-120188 | 4/2004 |
| JP | 2006-521632 | 9/2006 |
| JP | 2006-304184 | 11/2006 |
| JP | 2007-208993 | 8/2007 |
| JP | 2008-72437 | 3/2008 |
| JP | 2009-169933 | 7/2009 |
| JP | 2010-21840 | 1/2010 |
| JP | 2010-55143 | 3/2010 |
| JP | 2010-86166 | 4/2010 |
| JP | 2010-515119 | 5/2010 |
| JP | 2010-135945 | 6/2010 |
| JP | 2010-147912 | 7/2010 |
| JP | 2012-173942 | 9/2012 |
| JP | 2013-145450 | 7/2013 |
| JP | 2015-130056 | 7/2015 |
| JP | 2019-533860 | 11/2019 |
| WO | 2003/065303 | 8/2003 |
| WO | 2006/059366 | 11/2004 |
| WO | 2007/109891 | 10/2007 |
| WO | 2007/116830 | 10/2007 |
| WO | 2007/122870 | 11/2007 |
| WO | 2009/000446 | 12/2008 |
| WO | 2015/177490 | 11/2015 |
| WO | 2016/190008 | 12/2016 |
| WO | 2018/155382 | 8/2018 |

OTHER PUBLICATIONS

International Preliminary Report on Patentability dated Jun. 28, 2022 issued in corresponding IA No. PCT/US2020/067210 filed Dec. 28, 2020.

"Speakout RFID Tags," https://bones.ch/media/downloads-support/FAQ/eng/RFID_Tags_E.pdf Bones Inc., 2016, 2 pages.

"Introduction to Retail RFID Technology, Part 3—Tags," http://www.rfidarena.com/2016/1/7/introduction-to-retail-rfid-technology,-part-3-tags.aspx, Nordic ID Tech Geek, Jan. 7, 2016, 3 pages.

"Dig Deep—Construction of RFID Tags," https://rfid4u.com/rfid-basics-resources/dig-deep-rfid-tags-construction/, RFID4U, 2016, 6 pages.

"Low Price Competitive Price Warehousing Management Hang-on RFID Tags For Jewelry and Ticket In China Manufacturers and Suppliers," http://www.sinolabelings.com/rfid-label/warehousing-management-rfid-labels/competitive-price-warehousing-management-hang-on-r.html, Xiamen JinBar Information Technology Co. Ltd., downloaded Jul. 24, 2018, 12 pages.

* cited by examiner

TUNING BLOCK METHODS AND SYSTEMS FOR USE WITH REACTIVE STRAPS

CROSS-REFERENCE TO RELATED APPLICATION

The present application is a 371 of International Application No. PCT/US2020/067210, which was published in English on Jul. 1, 2021, and claims the benefit of U.S. Provisional Patent Application No. 62/954,474 filed Dec. 28, 2019, both of which are incorporated herein by reference in their entireties.

BACKGROUND

RFID tags and labels (collectively referred to herein as "devices") are widely used to associate an object with an identification code. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels.

At its most basic, an RFID device includes an RFID chip (which may be incorporated into an RFID strap) coupled to an antenna. Typically, an RFID strap is capacitively or conductively coupled to an antenna, by connection of the antenna to conductive pads of the strap, for example. An RFID strap may instead be configured as a reactive strap, in which an RFID chip is connected to a conductive ring. Rather than being connected to the associated antenna, the reactive strap is spaced from its antenna and is instead coupled to the antenna by reactance, via a magnetic and/or electric field.

For an RFID strap that is capacitively or conductively coupled to its antenna, the configuration of the antenna may be modified to adjust the frequency of the resulting RFID device. However, a reactive strap has a resonant frequency that is determined by the capacitance of the RFID chip and the inductance of the conductive ring, such that reconfiguring the antenna will not have the same effect that it would for a non-reactive strap. In other words, the reactive strap may be part of the tuning loop in the case of a capacitively or conductively coupled strap, whereas a reactive strap may be the tuning loop.

More particularly, the antenna response of an RFID device incorporating a reactive strap may include or consist of two basic poles, with one related to the resonant frequency of the reactive strap and the other related to the antenna. The coupling between the reactive strap and the antenna and the relative position in the frequency domain may be used to optimize the performance of the RFID device at a particular frequency and in applications involving loading of dielectrics and proximity to metal or other RFID devices, for example.

In a conventional RFID chip, the capacitance of the RFID chip cannot be adjusted to adjust the resonant frequency of the reactive strap. As a reactive strap may perform better at different frequencies, depending on a number of factors (e.g., the nature of the article to which the reactive strap is ultimately associated), it is known to provide a tunable RFID chip (i.e., one having an adjustable capacitance). In particular, as the RFID chip attempts to power up upon receiving a signal from an RFID reader, its auto-adjust circuit will automatically determine for each of a plurality of tunable capacitors whether that capacitor will receive current flow to maximize the power received by the RFID chip from the associated antenna. Such functionality, in which an RFID chip is capable of automatically adjusting its capacitance in order to increase its sensitivity, is commonly referred to as "auto-tuning."

While a tunable RFID chip may be an improvement upon a fixed frequency RFID chip, it is not without disadvantages. For example, all of the tunable capacitors are tuned each time that the RFID chip attempts to power up. By default, each tunable capacitor will receive current flow when the RFID chip attempts to power up. It may be the case that the starting capacitance (with each of the capacitors receiving current flow) results in such a mismatch between the antenna and the RFID chip that insufficient power is delivered to the auto-adjust circuit, such that a higher level of power (associated with lower sensitivity and the need for the RFID device to be closer to the RFID reader) is needed to start the auto-tuning process and optimize the power delivered to allow the RFID chip to reach its operating threshold.

Accordingly, it would be advantageous to provide a reactive strap having a resonant frequency that is adjustable via a different mechanism.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In some embodiments, an RFID device includes a reactive strap including an RFID chip and a conductive ring connected to the RFID chip. The RFID device may include an antenna configured to be coupled to the reactive strap, and a tuning block set positioned in the vicinity of the reactive strap, a resonant frequency of the RFID device being determined at least in part by at least one of the shape of the tuning block set and the position of the tuning block set relative to at least the reactive strap.

In some embodiments, the tuning block set may include one or more tuning blocks. The RFID device may include a substrate that is attached to at least part of the reactive strap, the antenna, and the tuning block set. The tuning block may be at least partially formed of a metallic material, an inorganic compound material, and/or a ceramic material. The tuning block set may include a tuning block that has an at least substantially uniform dimension transverse to a direction in which the tuning block is configured to be moved with respect to the reactive strap. The tuning block set may include a tuning block that has a non-uniform dimension transverse to a direction in which the tuning block is configured to be moved with respect to the reactive strap.

In some embodiments, the conductive ring and the tuning block set may be configured such that there is a substantially linear relationship between movement and/or positioning of the tuning block set with respect to the reactive strap and the change in the resonant frequency of the RFID device. The conductive ring and the tuning block set may be configured such that there is a non-linear relationship between movement and/or positioning of the tuning block set with respect to the reactive strap and the change in the resonant frequency of the RFID device.

In some embodiments, the conductive ring and the tuning block set may be configured such that there is a stepwise relationship between positioning of the tuning block set with respect to the reactive strap and the change in the resonant frequency of the RFID device. The tuning block set may be configured for movement and/or positioning in a plurality of axes with respect to the reactive strap. The tuning block set may not overlap any portion of the antenna. The tuning block set may overlap a portion of the antenna. The antenna may be configured as a monopole antenna. The tuning block set may have a variable size. The tuning block set may be configured to cause a change in the resonant frequency of the RFID device by overlapping a portion of the conductive ring. The tuning block set may be configured to cause a change in the resonant frequency of the RFID device without overlapping any portion of the conductive ring.

In some embodiments, a method of forming a tuned RFID device may include placing a tuning block set with respect to a reactive strap of an RFID device to set a resonant frequency of the RFID device, wherein the RFID device may include an antenna and the reactive strap including an RFID chip and a conductive ring connected to the RFID chip. The method may also include fixing a position of the tuning block set with respect to the reactive strap to define the resonant frequency of the RFID device.

In some embodiments, the tuning block set may include one or more tuning blocks. The RFID device may include a substrate that is attached to at least part of the reactive strap, the antenna, and the tuning block set. Placing the tuning block set with respect to the reactive strap may include causing a portion of the tuning block set to overlap a portion of the conductive ring. Placing the tuning block set with respect to the reactive strap may include preventing the tuning block set from overlapping any portion of the conductive ring.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
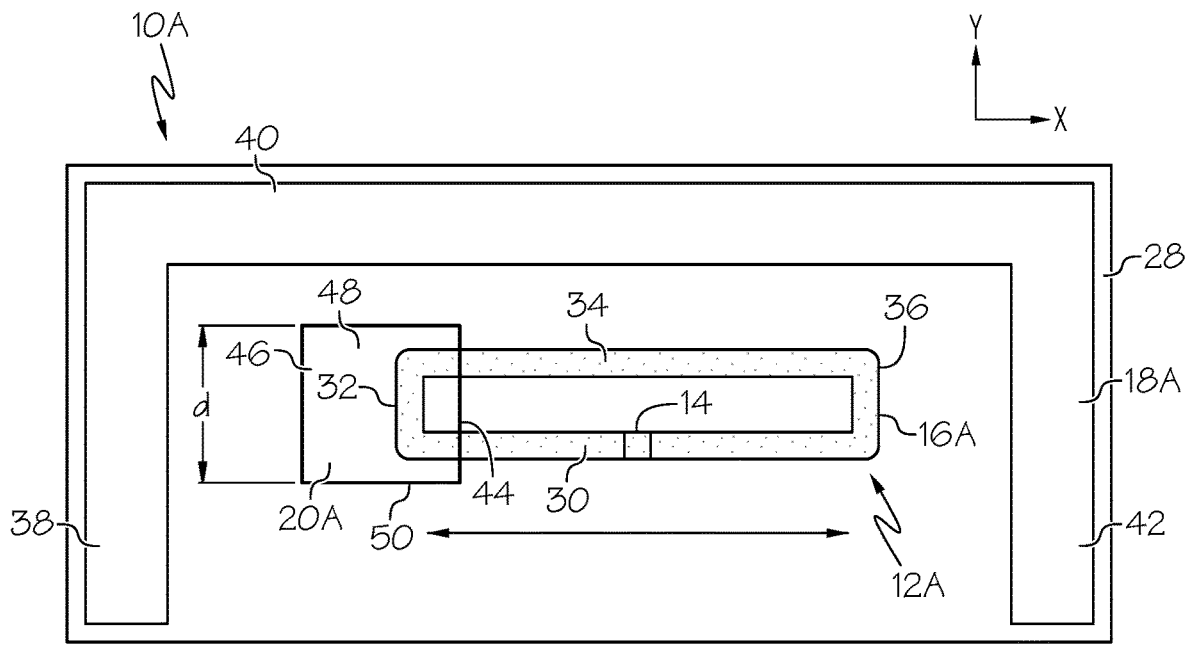
FIG. 1 is a schematic view of an exemplary RFID device including a tuning block in accordance with some embodiments.

FIG. 1 illustrates an exemplary embodiment of an RFID device 10A in accordance with some embodiments. The RFID device 10A includes a reactive strap 12A having an RFID chip 14 connected to a conductive ring 16A. The reactive strap 12A may be particularly configured to combine with the other components of the RFID device 10A, or may have other designs. For example, in some embodiments such as in FIG. 1, the conductive ring 16A may be substantially rectangular, with a high aspect ratio (i.e., a width that is significantly greater than its height). Significantly greater may mean greater by 10-20%, 20-30%, 30-40%, 40-50%, 50-60%, 60-80%, 80-100%, or it may mean that the width is a multiple of the height such as between 2-3 times, 3-5 times, 5-10 times, or 10-100 times, or greater.

Some other embodiments may include a conductive ring that is partly, substantially, or entirely annular or have other shapes, which will be described in greater detail below with respect to FIGS. 9A-C. While it may be advantageous for conductive rings incorporated into RFID devices according to the present disclosure to have a high aspect ratio, various embodiments may have medium or low aspect ratios.

The conductive ring 16A may include a first side 30, a second side 32, a third side 34, and a fourth side 36. The first side 30 and the third side 34 may have a length that extends along the X-axis direction with a width measured along the Y-axis direction. The second side 32 and the fourth side 36 may have a length that extends along the Y-axis direction with a width measured along the X-axis direction. For the first side 30, second side 32, third side 34, and fourth side 36, the length may be greater than the width by a factor of between 1-2 times, 2-6 times, 6-10 times, 10-20 times, 20-40 times, 40-100 times, 100-1000 times, or greater. The first side 30 and the third side 34 may each have a length that is longer than the length of each of the second side 32 and the fourth side 36.

Some embodiments, such as the RFID device 10A of FIG. 1, include an antenna 18A. The antenna 18A is illustrated in FIG. 1 as a dipole antenna, but other embodiments can use other antennas. Rather than being capacitively or conductively connected to the reactive strap 12A, the antenna 18A may be spaced apart from the reactive strap 12A and coupled to the reactive strap 12A by reactance, via a magnetic and/or electric field. The reactive strap 12A and the antenna 18A may be disposed on a substrate 28 and/or backing material. The position of the reactive strap 12A with respect to the antenna 18A may vary in some embodiments. In the illustrated embodiment, the reactive strap 12A is placed adjacent to the area of highest magnetic field and lowest electric field which, for a dipole antenna, may be at its center.

The antenna 18A may include a first part 38, a second part 40, and a third part 42. The first part 38 and the third part 42 may a length that extends along the Y-axis direction with a width measured along the X-axis direction. The second part 40 may have a length that extends along the X-axis direction with a width measured along the Y-axis direction. For the first part 38, the second part 40, and the third part 42, the length may be greater than the width by a factor of between 1-2 times, 2-6 times, 6-10 times, 10-20 times, 20-40 times, 40-100 times, 100-1000 times, or greater.

In some embodiments, the first part 38 may be spaced apart from and proximate to the second side 32. The second part 40 may be spaced apart from and proximate to the third side 34. The third part 42 may be spaced apart from and proximate to the fourth side 36.

In some embodiments, in addition to the reactive strap 12A and the antenna 18A, the RFID device 10A further includes a tuning block 20A. The tuning block 20A may be configured to be moved and/or placed in various positions with respect to the reactive strap 12A, such as during manufacture of the RFID device 10A. This movement and/or variation in placement is illustrated in FIG. 1 as movement and/or variation in location in a horizontal direction or axis (e.g., along the X-axis), but the tuning block 20A may instead be moved in a different direction or axis (e.g., along the Y-axis or Z-axis, or combinations of the X, Y, and Z-axes), which may include the tuning block 20A being moved in one or more of a plurality of axes with respect to the reactive strap 12A. For example, moving the tuning block 20A along the Z-axis may require placing one or more layers of material between the tuning block 20A and the reactive strap 12A.

The tuning block 20A is configured such that changing its position with respect to the reactive strap 12A will change or "tune" the resonant frequency of the RFID device 10A. Once the tuning block 20A has been moved to and/or placed at a position that produces the desired resonant frequency, its position with respect to the reactive strap 12A may be fixed according to any suitable approach (e.g., by securing the tuning block 20A to the same substrate as the other components of the RFID device 10A) in order to define and maintain the resonant frequency of the RFID device 10A. Securing may be accomplished using methods such as an adhesive that may be conductive or non-conductive, welding, clamping, lamination, fasteners, or other methods. The tuning block 20A may be secured to one or more of the substrate 28, the conductive ring 16A, and/or the antenna 18A.

In some embodiments, the tuning block 20A is a solid component that may be moved to a preferred location, and temporarily fixed in place relative to the substrate 28, the conductive ring 16A, and/or the antenna 28. In other embodiments, the tuning block 20A may be moved to a desired location and fixed in place to achieve known and pre-tested and/or predicted resonant frequency characteristics for the RFID device 10A. In some embodiments, the tuning block 20A is created and/or manufactured at the desired location, such as through 3D printing, painting, electroplating, chemical vapor deposition, physical vapor deposition, sputtering, or other fabrication techniques.

In some embodiments, the tuning block 20A may be fixed in location first (e.g., on the substrate 28), and one or more of the antenna 18A and the conductive ring 16A may be moved relative to the tuning block 20A before being fixed in place to achieve an RFID device 10A with desired resonant frequency characteristics. In some embodiments, one or more of the tuning block 20A, the antenna 18A, and the conductive ring 16A may be formed at the desired locations to achieve the desired resonant frequency characteristics of the RFID device 10A. For example, in some embodiments, the tuning block 20A may be formed or placed on top of the conductive ring 16A, which may cause the conductive ring 16A to be disposed between the tuning block 20A and the substrate 28. In some embodiments, the conductive ring 16A may be formed or placed on top of the tuning block 20A, which may cause the tuning block 20A to be disposed between the conductive ring 16A and the substrate 28.

The substrate 28 may be formed in part or entirely from non-conductive materials. One or more of the antenna 18A, the conductive ring 16A, and the tuning block 20A may be formed in part or entirely from conductive materials. Materials that may be used to form part or all of the components described herein may include one or more of plastic, glass, metal, wood, paper, cardboard, carbon fiber, ceramic, and/or metal foil.

By using the disclosed systems and methods, a single set of components may be used for RFID devices to be employed in widely differing applications (e.g., an RFID device to be applied to an article of clothing, an RFID device to be applied to a car windshield), with the relative position of the tuning block 20A being selected to define an appropriate resonant frequency.

In some embodiments, such as in FIG. 1, moving and/or forming one or both of the tuning block 20A and the reactive strap 12A to cause overlap between at least a portion of the reactive strap 12A and at least a portion of the tuning block 20A may cause a change in at least one property of the reactive strap 12A (e.g., the inductance), which results in a change in the resonant frequency of the RFID device 10. Depending on the configuration of the tuning block 20A, increasing the degree of overlap will either increase the resonant frequency of the RFID device 10A (e.g., with a decrease in the degree of overlap decreasing the resonant frequency of the RFID device 10A) or decrease the resonant frequency of the RFID device 10A (e.g., with a decrease in the degree of overlap increasing the resonant frequency of the RFID device 10A).

Figure 2:
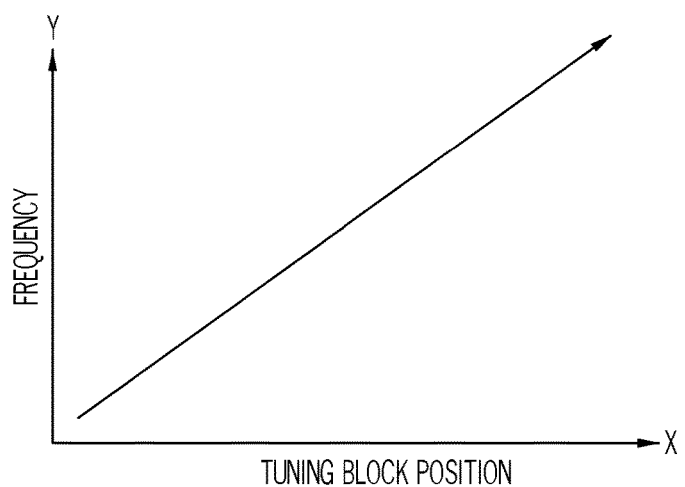
FIG. 2 illustrates a relationship between the position of the tuning block and the resonant frequency of the RFID device of FIG. 1.

The tuning block 20A of FIG. 1 is shown as having a substantially square configuration, with the tuning block 20A being spaced away and separate from the antenna 18A. By providing the tuning block 20A with an at least substantially uniform dimension "d" that is aligned with the Y-axis and is transverse to the direction (e.g., along the X-axis direction) in which the tuning block 20A is moved and/or selectively placed or formed with respect to the reactive strap 12A, there may be a linear relationship between a change in the position of the tuning block 20A with respect to the reactive strap 12A and the associated change in the resonant frequency of the RFID device 10A, as shown in FIG. 2. However, in some embodiments, there may be a non-linear relationship between a change in the relative position of the tuning block and the resulting change in the resonant frequency of the RFID device. Various relationships between relative positions of the tuning block and the conductive ring and the resulting resonant frequency of the RFID device 10A may apply depending on the shape of the tuning block and/or the shape of the conductive ring. Some additional examples of shapes of the conductive ring are provided in FIGS. 9A-9C, and some additional examples of the shape of the tuning block are provided in FIGS. 10A-10F.

The materials and methods described with respect to the embodiments discussed above with respect to FIG. 1 may also be applied to the remaining embodiments of this disclosure, including but not limited to the embodiments of FIGS. 3-13.

Figure 3:
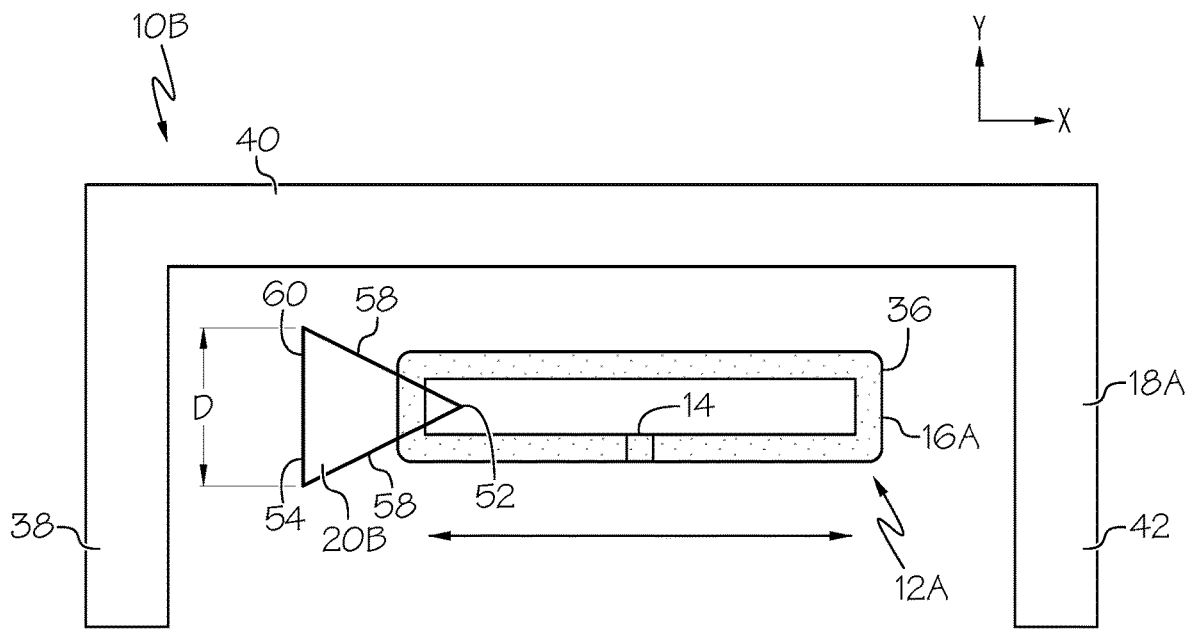
FIG. 3 is a schematic view of another embodiment of an exemplary RFID device including a tuning block in accordance with some embodiments.
Figure 4:
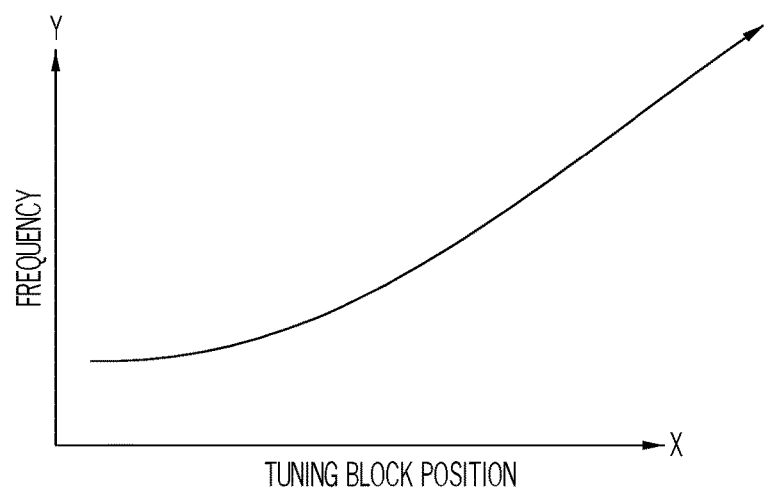
FIG. 4 illustrates a relationship between the position of the tuning block and the resonant frequency of the RFID device of FIG. 3.

FIG. 3 shows an RFID device 10A with a tuning block 20B having a different configuration from the tuning block 20A of FIG. 1, which may result in a different, non-linear relationship between a change in the position of the tuning block 20B with respect to the reactive strap 12A and the associated change in the resonant frequency of the RFID device 10B, such as shown in FIG. 4. In some embodiments, the tuning block 20A of FIG. 3 is configured as a triangle, with one corner being the leading or trailing end of the tuning block 20A as it is moved with respect to the reactive strap 12A (depending on the direction of movement and/or positioning variation). The tuning block 20B may include a first end 52, a second end 54, a first side 56, a second side 58, and a third side 60. The tuning block 20B may taper from the second end 54 to the first end 52, and the first end 52 may be a corner defined by the intersection of the first side 56 and the third side 60.

It should be understood that FIG. 3 illustrates one possible configuration for a tuning block having an irregular or non-constant dimension "D" measured along the Y-axis, which is transverse to the direction in which the tuning block is moved (e.g., along the X-axis) and/or positioned with respect to the associated reactive strap, and other configurations are also possible.

As shown in FIG. 4, the illustrated movement and/or positioning of the tuning block 20A of FIG. 3 with respect to the associated reactive strap 12A may result in a non-linear position-to-frequency relationship in the form of a second order polynomial as there is more or less overlap between the tuning block 20B and the reactive strap 12A. However, the configurations of the tuning block 20B and/or the reactive strap 12A and/or the nature of the relative movement and/or positioning variation between the tuning block 20A and the reactive strap 12A may be varied to result in any of a variety of position-to-frequency relationships. Additional variations with respect to the conductive ring 16A may be found in FIGS. 9A-C, and additional variations with respect to the tuning block 20A-B may be found in FIGS. 10A-F.

Figure 5:
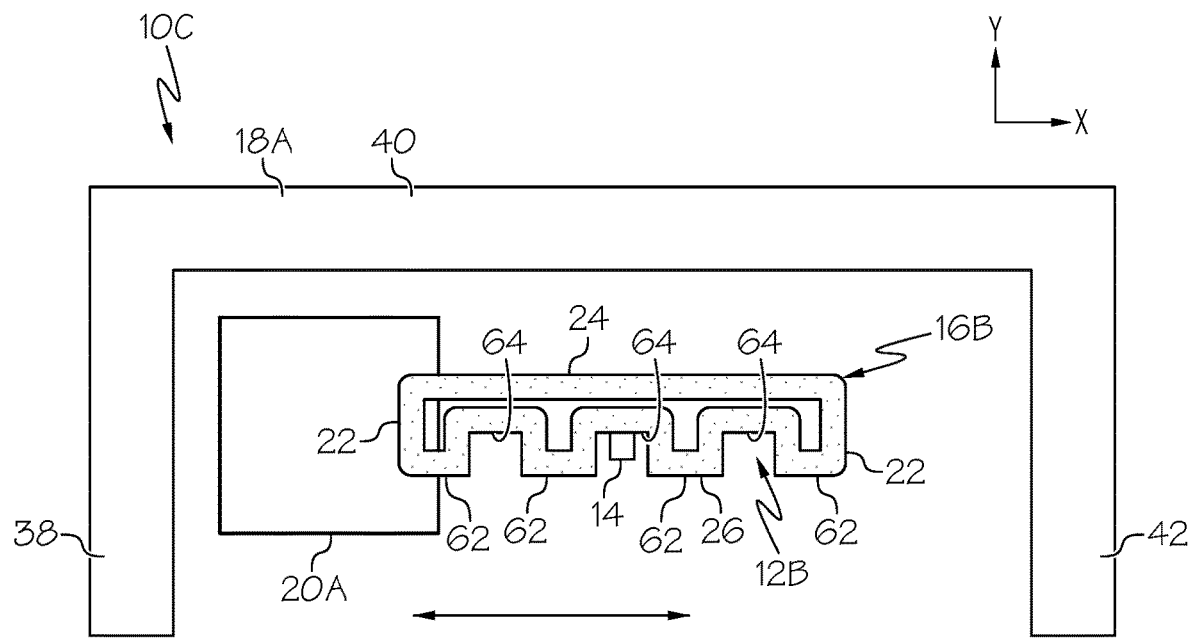
FIG. 5 is a schematic view of another exemplary RFID device including a tuning block in accordance with some embodiments.

For example, FIG. 5 illustrates how the configuration of the reactive strap (rather than the configuration of the tuning block or the nature of the relative movement and/or positioning) may be modified to change the nature of the position-to-frequency relationship. In the embodiment of FIG. 5, the tuning block 20A is configured as in FIG. 1, with an at least substantially uniform dimension transverse to the direction in which the tuning block 20 may be moved and/or altered in position relative to the reactive strap 12B. Again, in various embodiments, one or more of the tuning block, the reactive strap, and/or the antenna may be moved and/or altered in position to achieve different resonant frequencies. In various embodiments, one or more of the tuning block, the reactive strap, and/or the antenna may be fixed in position such as by attachment to the substrate 28. This may reduce the number of variables and/or moving parts needed to achieve a particular configuration for relative positions between the tuning block, the reactive strap, and/or the antenna and a corresponding resonant frequency by moving and/or positioning one or more of the remaining non-fixed components.

When the reactive strap 20 is configured as in FIG. 1, with a conductive ring 16A having a substantially rectangular configuration, there may be a linear relationship between a change in the degree of overlap between the tuning block 20 and the reactive strap 12A and a change in the resonant frequency of the RFID device 10A (as in FIG. 2). In some embodiments, such as in FIG. 5, the RFID device 10C may include a conductive ring 16B having a non-rectangular configuration. In some embodiments, the conductive ring 16B may include two opposing, substantially linear shorter edges 22, a substantially linear longer edge 24 extending between the short edges 22, and a non-linear longer edge 26 also extending between the short edges 22. In the illustrated embodiment, the non-linear edge 26 is provided in the shape of a square wave, but a non-linear edge or region of a conductive ring may have other configurations in various embodiments. For example, the non-linear edge 26 may be formed as a sawtooth wave, a sine wave, one or more protrusions having different heights, one or more indentations having different heights, or other shapes. For example, the non-linear edge 26 may have one, two, three, or more protrusions 62 that extend along the Y-axis away from or towards the second part 40 of the antenna 18A. In some embodiments, the non-linear edge 26 may have one, two, three, or more indentations 64 that extend along the Y-axis away from or towards the second part 40 of the antenna 18A.

Figure 6:
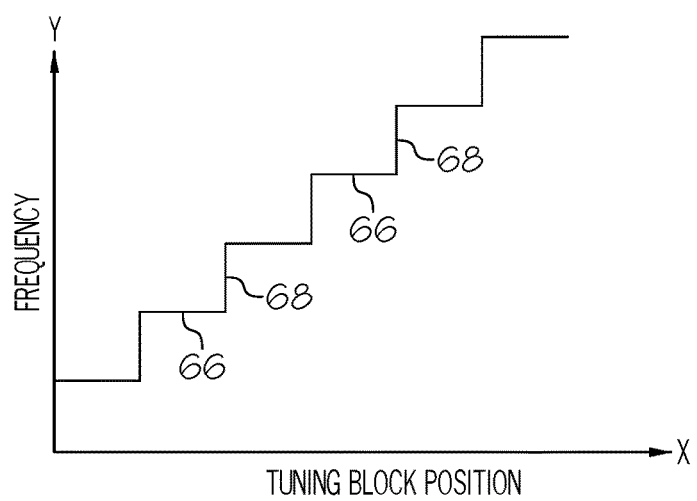
FIG. 6 illustrates a relationship between the position of the tuning block and the resonant frequency of the RFID device of FIG. 5.
Figure 11:
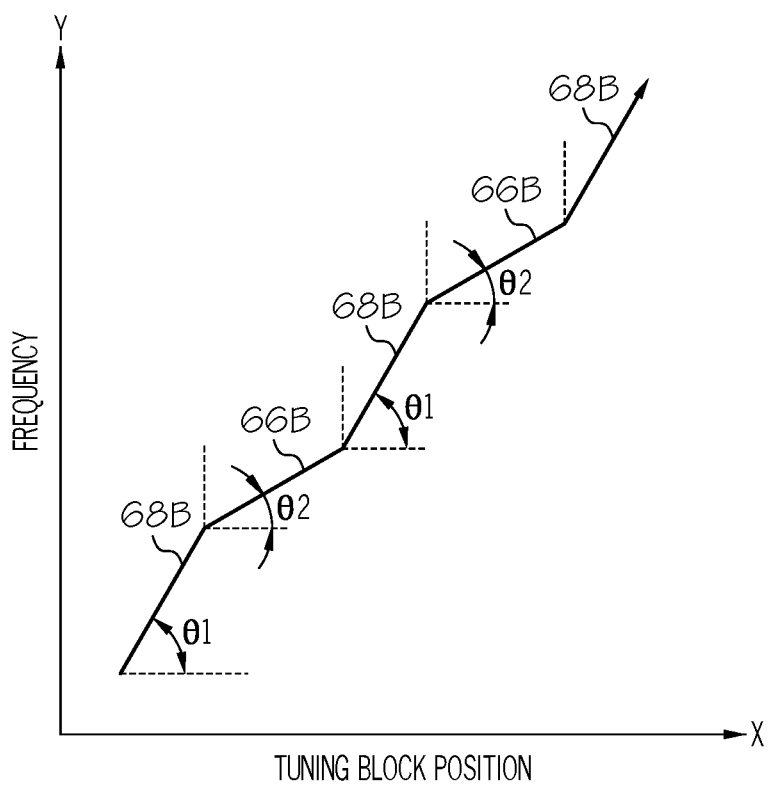
FIG. 11 illustrates a relationship between the position of the tuning block and the resonant frequency of the RFID device in accordance with some embodiments.

A length dimension of the non-linear edge 26 of the conductive ring 16B may extend in the direction of relative movement and/or positioning differences (e.g., along the X-axis) of the tuning block 20A, which may result in a non-linear relationship between the change in the degree of overlap between the tuning block 20A and the reactive strap 12B and the resonant frequency of the RFID device 10C, such as in FIG. 6. The curve of FIG. 6 may include one or more flatter regions 66A and one or more steeper regions 68A. The flatter regions 66A may have a smaller angle relative to the X-axis of FIG. 6 than the angle formed between the steeper regions 68A and the X-axis of FIG. 6. As shown in FIG. 11, the flatter regions 66B may form an angle θ1 with the X-axis, and the steeper regions 68B may form an angle θ2 with the X-axis. θ2 may be greater than θ1. θ1 may be between 0-5, 5-10, 10-20, 20-30, or 3045 degrees, and θ2 may be greater than θ1 by between 0-5, 5-10, 10-20, 20-30, 30-45, or 45-90 degrees.

The stepwise relationship shown in FIG. 6 or FIG. 11 may be advantageous due to the one or more flatter regions 66 in which there is no change, substantially no change, or less change (relative to the steeper regions 68) in resonant frequency upon relative movement and/or positioning differences of the tuning block 20A with respect to the reactive strap 12B. This may allow for a degree of instability, inconsistency, and/or inaccuracy in the relative positioning of the tuning block 20A and the reactive strap 12B, which may be caused by imperfections in the systems assembling the RFID device 10C. When the target arrangement of the tuning block 20A and reactive strap 12B is within one of the flatter regions, a minor misalignment (due to imperfections in the assembly machinery, for example) will not affect the resonant frequency, provided that the misalignment is not so significant that the arrangement has strayed from the target flatter region to another section of the curve. The components of the RFID device 10D may be intended to be configured to achieve the center of a flatter region 66, and misalignments of one or more of the components of the RFID device 10D may thus still result in achieving a resonant frequency that is still within the target flatter region 66.

In some embodiments, such as in FIGS. 1, 3, and 5, the tuning block may be spaced apart and separate from the antenna 18 (e.g., 18A, 18B, or another antenna) of the RFID device 10 (e.g., one of 10A-F, or another RFID device) to prevent electric field coupling of the tuning block 20 (e.g., one of tuning block 20A-H, or another tuning block) and the antenna 18 (e.g., one of antenna 18A-B, or another antenna).

Figure 7:
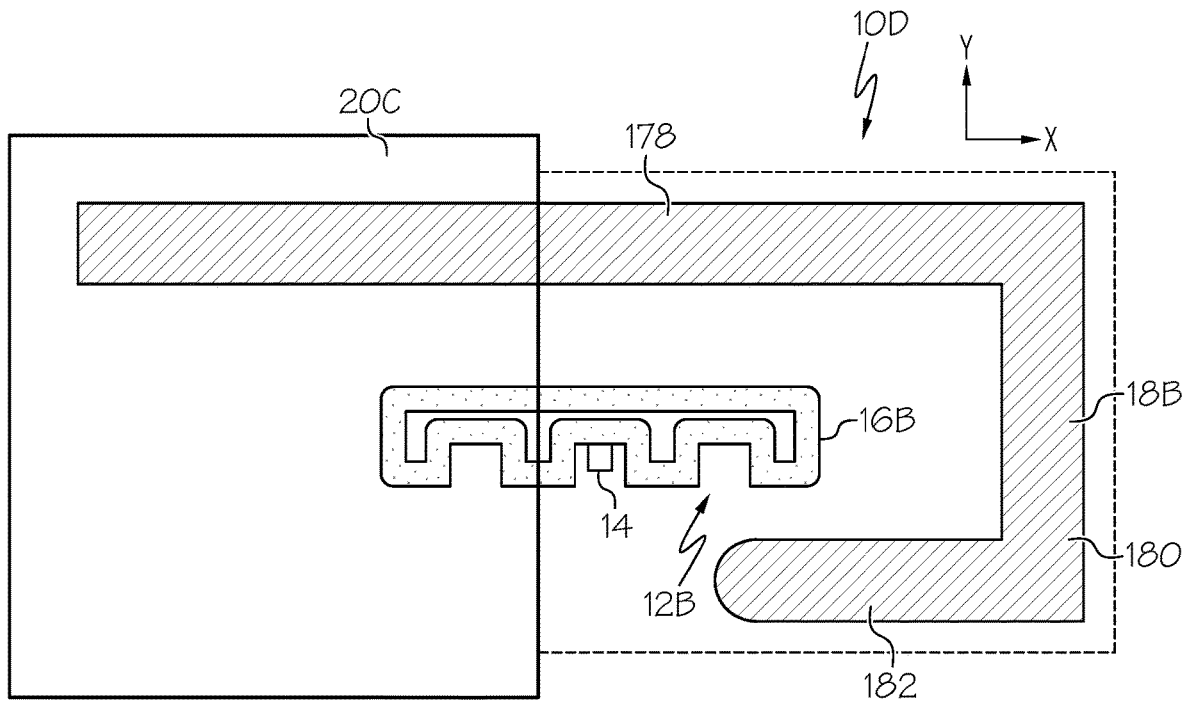
FIG. 7 is a schematic view of another exemplary RFID device including a tuning block in accordance with some embodiments.

In some embodiments, such as in FIG. 7, the tuning block may be connected to or at least partially overlap the associated antenna 18. The RFID device 10D of FIG. 7 comprises a reactive strap 12B, an antenna 18B, and a tuning block 20C. The antenna 18B may include a first part 178, a second part 180, and a third part 182. The first part 178 and the third part 182 may include a length that extends along the X-axis direction with a width measured along the Y-axis direction. The second part 180 may have a length that extends along the Y-axis direction with a width measured along the X-axis direction. For the first part 178, the second part 180, and the third part 182, the length may be greater than the width by a factor of between 1-2 times, 2-6 times, 6-10 times, 10-20 times, 20-40 times, 40-100 times, 100-1000 times, or greater.

The first part 178 may extend along the X-axis direction past the side of the conductive ring 16B that is farthest from the second part 180 along the X-axis direction. The third part 182 may extend along the X-axis direction from the second part 180 past the closest side of the conductive ring 16B along the X-axis. The third part 182 may terminate before extending past the side of the conductive ring 16B that is farthest from the second part 180. The conductive ring 16B may be disposed partially or entirely between the first part 178 and the third part 182.

The reactive strap 12B is shown as being configured as in the embodiment of FIG. 5, but it may be differently configured in some embodiments. As for the antenna 18B, it is configured as a monopole antenna, with a tuning block 20C that overlaps at least portions of both the reactive strap 12B and the antenna 18C. By connecting or overlapping the antenna 18B and the tuning block 20C, an electric field connection may be created between the two. In some embodiments, this configuration unbalances the antenna 18C, which may be advantageous in certain applications. In some embodiments, the tuning block 20C is configured and/or positioned to contact at least part of the first part 178 and the conductive ring 16B. In some embodiments, the tuning block 20C is configured and/or positioned to contact at least part of the first part 178, the conductive ring 16B, and the third part 182.

In some embodiments, such as in FIG. 7, the initial position of the tuning block 20C with respect to the reactive strap 12B and to the antenna 18C may determine the resonant frequency of the RFID device 10C, along with the performance characteristics of the antenna 18B. As in the embodiments of FIGS. 1, 3, and 5, moving the tuning block 20C and/or positioning the tuning block 20C at different locations with respect to the reactive strap 12B will change the resonant frequency of the RFID device 10D. However, due to the overlap of the tuning block 20C and the antenna 18C, a change in the position of the tuning block 20C may also vary the characteristics of the antenna 18B. By providing an RFID device 10C with two components (namely, the reactive strap 12B and the antenna 18C) that can interact separately with a positionable tuning block 20C, performance of the RFID device 10C may be stabilized to compensate for tolerances in placement of the tuning block 20C with respect to the other components of the RFID device 10C, such as during attachment by hand or during other manufacturing processes.

Figure 8:
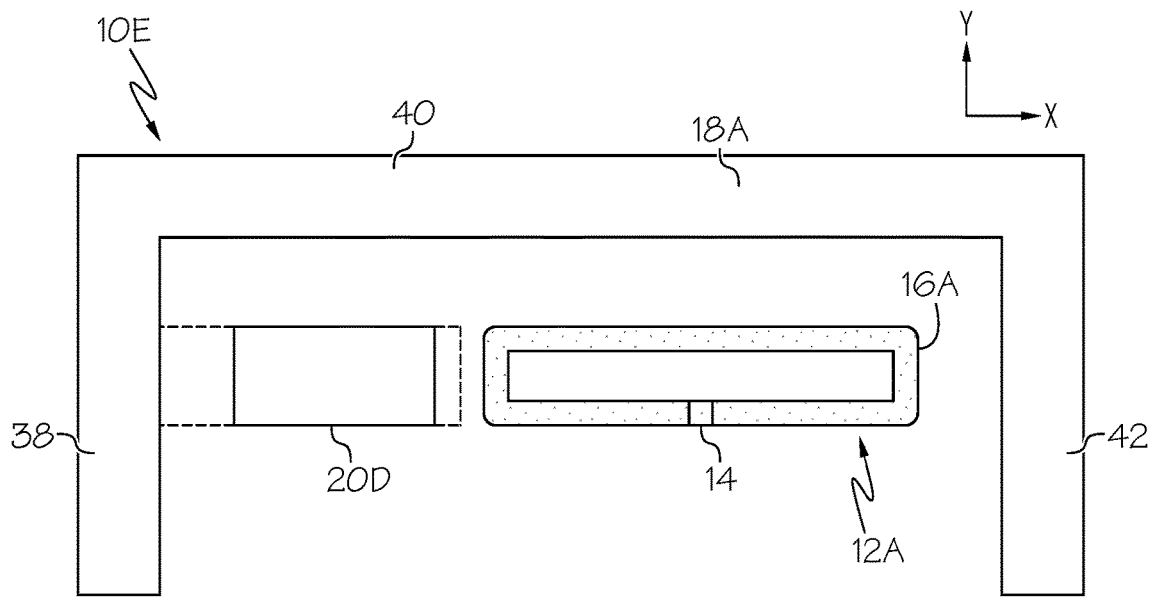
FIG. 8 is a schematic view of yet another embodiment of an exemplary RFID device including a tuning block in accordance with some embodiments.

In addition to the possibility of a tuning block being connected to the antenna of an RFID device, it is also within the scope of the present disclosure for a tuning block to be formed as part of the antenna, as in the embodiment of FIG. 8. In the embodiment of FIG. 8, an RFID device 10D includes a reactive strap 12A and an antenna 18D, with a tuning block 20D that is formed as part of the antenna 18D. The antenna 18A may include a first part 38, a second part 40, and a third part 42.

The tuning block 20D may be configured to have a variable size and/or configuration, with an initial size and configuration of the tuning block 20D shown in solid lines in FIG. 8 and with a subsequent size and configuration shown in broken lines. It should be understood that the broken lines represent one exemplary configuration into which the tuning block 20D may be changed, and that the tuning block 20D may be changed into one or more other sizes and/or configurations in some embodiments. Varying the size or configuration of the tuning block 20D may also, like moving and/or repositioning the tuning blocks 20A-C and E-I, affect the resonant frequency of the RFID device 10D.

In addition to be being configured in any of a number of sizes and shapes, tuning blocks according to the present disclosure may be formed of any of a number of possible materials, which will have varying effects on the performance of the RFID device into which the tuning block is incorporated. For example, in addition to the materials listed above, a tuning block may be at least partially formed of a metallic material, an inorganic compound material, and/or a ceramic material. In one embodiment, the tuning block may be at least partially formed of a conductive material (e.g., aluminum), in which case changing the position of the tuning block may cause a change in the resonant frequency of the RFID device without the tuning block having to overlap any portion of the reactive strap. In some embodiments, the tuning block may be at least partially formed of a material having a relatively high dielectric constant (e.g., barium titanate or titanium dioxide). In such an embodiment, if the reactive strap has a gap with a differential electric field across it (e.g., the location at which the RFID chip is connected to the conductive ring), moving the tuning block across the gap may create a capacitance between the points of the reactive strap separated by the gap, thereby changing the resonant frequency of the RFID device.

In some embodiments, the tuning block may be at least partially formed of a material having a high relative permittivity (e.g., a ferrite material) to adjust the resonant frequency of the RFID device as the relative position of the tuning block is changed. In a further embodiment, the tuning block may be at least partially formed of a material that is resistive or has a relatively high dielectric or magnetic loss. Changing the degree of overlap or the degree of proximity of such a tuning block with respect to the associated reactive strap will affect the resonant frequency of the RFID device (as described above), but may risk (due to energy loss) degrading the performance of the RFID device (reducing cross-reading in certain situations). However, another possible effect is an increase in the bandwidth of the RFID device, which may improve the performance of the RFID device in certain applications. Additional factors, such as the thickness and/or magnetic permeability of the tuning block may also be considerations when selecting a suitable tuning block configuration.

Figure 9A:
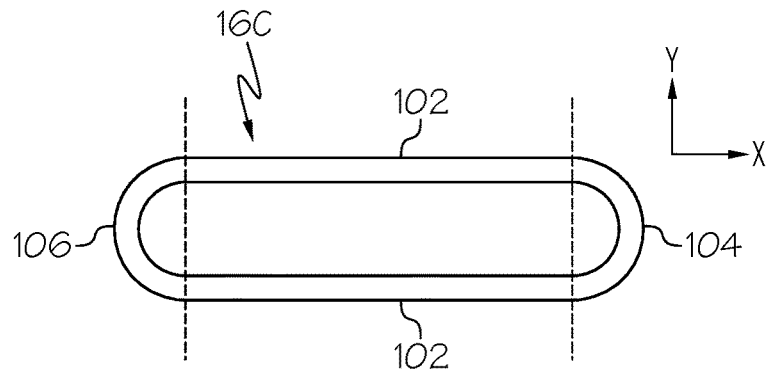
FIGS. 9A-9C are schematic views of exemplary conductive rings in accordance with some embodiments.
Figure 9B:
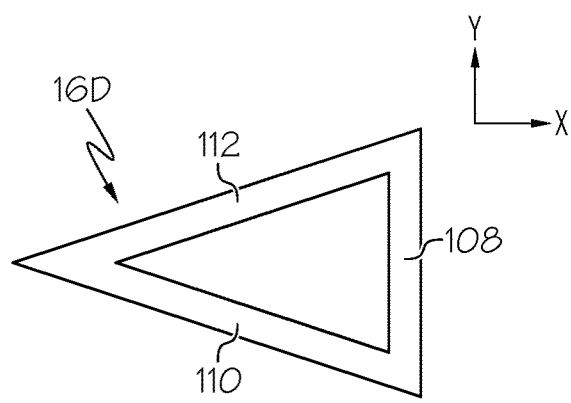
Figure 9C:
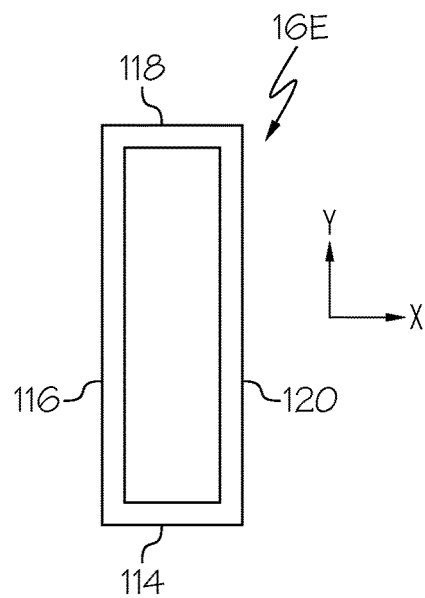

FIGS. 9A-9C are schematic views of exemplary conductive rings in accordance with some embodiments. In some embodiments, such as in FIG. 9A, a conductive ring 16C may include two sides 102 that may be substantially linear and having a length that extends along an X-axis direction and a width measured along the Y-axis direction. A conductive ring 16C may include a first curved end 106 and/or a second curved end 104. The use of curving ends may reduce mechanical stress concentration and/or other effects. For example, the relationship between a change in frequency and a change in position of a tuning block may be non-linear as the tuning block is moved and/or positioned at different locations across the curved end, but the relationship may transition to a linear or substantially linear relationship as the tuning block begins to move across and/or be positioned at different locations that overlap with the sides 102. For the sides 102, the length may be greater than the width by a factor of between 1-2 times, 2-6 times, 6-10 times, 10-20 times, 20-40 times, 40-100 times, 100-1000 times, or greater.

In some embodiments, such as in FIG. 9B, a conductive ring 16D may have a tapering or triangular shape. For example, the conductive ring 16D may include a first side 108, a second side 110, and a third side 112. The conductive ring 16D may have a variety of orientations with different effects based on movement and/or positioning of a tuning block of various shapes moving along, being positioned at different locations, or having different shapes relative to an X-axis direction. For example, the first side 108 may be parallel to the Y-axis direction, the X-axis direction, or a different direction. The second side 110 and the third side 112 may have equal lengths or may differ in length.

For some embodiments, the first side 108 may be parallel to the Y-axis and may be proximate or distal to a tuning block that is being moved toward the conductive ring 16D. For embodiments where the tuning block is square or rectangularly shaped and first encounters the corner between the second side 110 and the third side 112 as it moves along the X-axis direction toward the first side 108, the resonant frequency of the RFID device may increase nonlinearly with increasing rates of frequency change relative to the relative position between the tuning block and the conductive ring 16D. For embodiments where the tuning block is square or rectangularly shaped and first encounters the first side 108 as it moves along the X-axis direction toward the corner between the second side 110 and the third side 112, the resonant frequency of the RFID device may increase non-linearly with decreasing rates of frequency change relative to the relative position between the tuning block and the conductive ring 16D.

In some embodiments, such as in FIG. 9C, a conductive ring 16E may include a first side 114, a second side 116, a third side 118, and a fourth side 120. The first side 114 and the third side 118 may have a length that extends along the X-axis direction with a width measured along the Y-axis direction. The second side 116 and the fourth side 120 may have a length that extends along the Y-axis direction with a width measured along the X-axis direction. For the first side 114, second side 116, third side 118, and fourth side 120, the length may be greater than the width by a factor of between 1-2 times, 2-6 times, 6-10 times, 10-20 times, 20-40 times, 40-100 times, 100-1000 times, or greater. The first side 114 and the third side 116 may each have a length that is shorter than the length of each of the second side 118 and the fourth side 120.

Figure 10A:
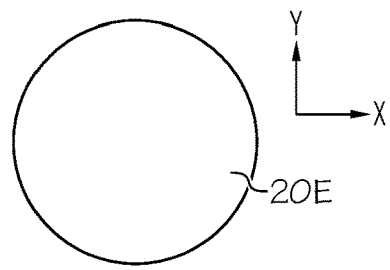
FIGS. 10A-10F are schematic views of exemplary tuning blocks in accordance with some embodiments.

FIGS. 10A-10F are schematic views of exemplary tuning blocks in accordance with some embodiments. In some embodiments, one or more of the tuning blocks shown in FIGS. 1, 3, 5, 7, 8 and 10A-10F may be used to adjust a resonant frequency of an RFID device. In some embodiments, such as shown in FIG. 10A, a tuning block 20E may be circular and/or rounded in shape. For oval shaped tuning blocks, a longest dimension of the oval may be aligned with the X-axis, the Y-axis, or any other direction within the XY-plane.

Figure 10B:
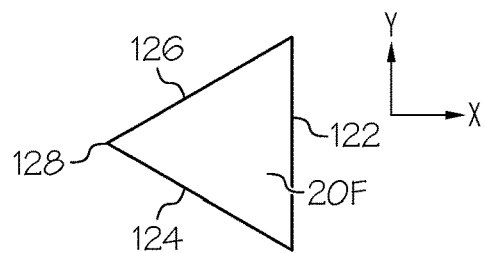

In some embodiments, such as in FIG. 10B, a tuning block 20F may have a triangular shape that includes a first side 122, a second side 124, a third side 126, and an end 128 opposite the first side 122. One or more of the first side 122, the second side 124, and the third side may have the same or different lengths. In some embodiments, a line extending from the end 128 to the midpoint of the first side 122 may be aligned with the X-axis, the Y-axis, or another direction in the XY-plane.

Figure 10C:
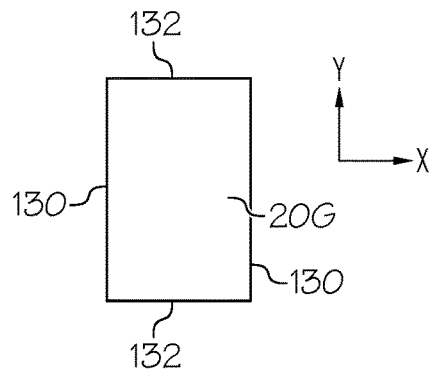

In some embodiments, such as in FIG. 10C, a tuning block 20G may have a rectangular shape that is longer along a Y-axis measurement than an X-axis measurement. The tuning block 20G may include a pair of first sides 130, and a pair of second sides 132. The first sides 130 may be aligned with the Y-axis, and the second sides 132 may be aligned with the X-axis, and the first sides 130 may be longer than the second sides 132.

Figure 10D:
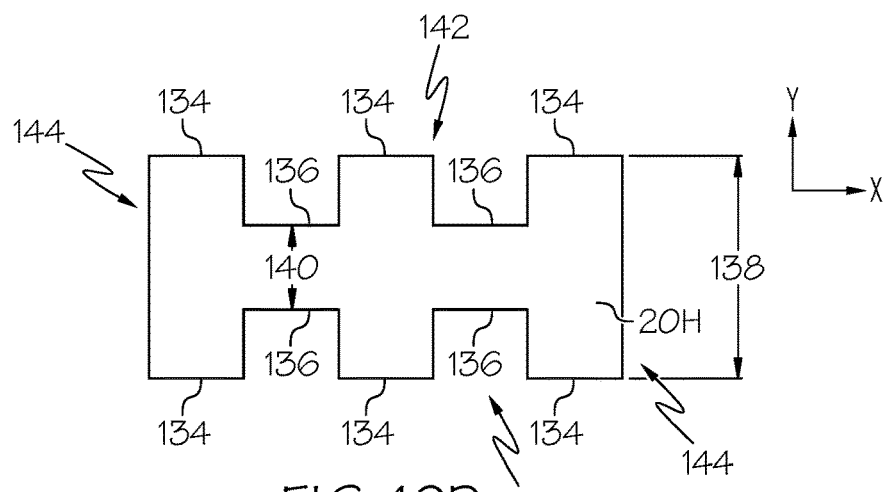

In some embodiments, such as in FIG. 10D, a tuning block 20H may include a pair of first sides 142 and a pair of second sides 144. The first sides 142 may be longer than the second sides 144 or vice versa. The first sides 142 may be aligned with the X-axis, the Y-axis, or with other directions in the XY-plane. The first sides 142 may include one or more protrusions 134 and/or one or more indentations 136. The length 138 of the largest dimension of the tuning block 20H as measured along the Y-axis may be greater than the smallest dimension of the tuning block 20H as measured along the Y-axis by a factor of between 0-2, 2-4, 4-10, or 10-100.

Figure 10E:
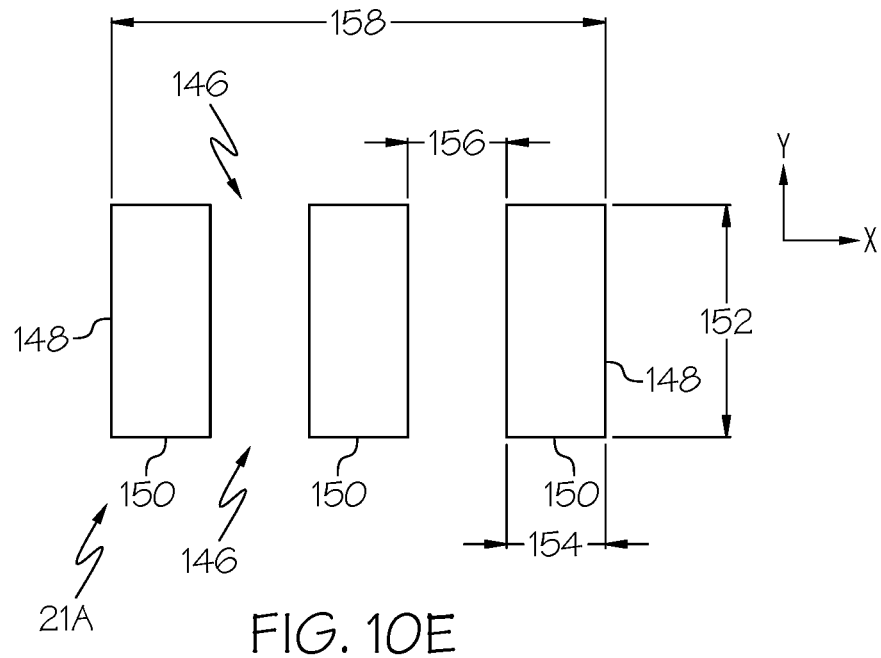

In some embodiments, such as in FIG. 10E, a tuning block set 21A may be composed of one or more tuning blocks 150. The tuning block set 21A may include a pair of first sides 146 and a pair of second sides 148. The first sides 146 may be longer than the second sides 148 or vice versa. The first sides 146 may be aligned with the X-axis, the Y-axis, or with other directions in the XY-plane.

In some embodiments, each of the tuning blocks 150 of the tuning block set 21A may be aligned along the Y-axis and spaced apart along the X-axis by a distance 156. Each of the tuning blocks may have a length 152 and a width 154, and the length 152 may be greater than the width 154. The length 152 may be aligned with the Y-axis or with other directions in various embodiments.

In operation, when moved or placed at various positions, the resonant frequency of an RFID device may increase or otherwise change at a faster rate with greater changes of overlap between one or more of the tuning blocks 150 and a conductive ring. In contrast, the resonant frequency of the RFID device may increase or otherwise change at a slower rate when changes in position of the tuning block set 21A do not change the amount of overlap between one or more tuning blocks 150 but do change a proximity of an additional tuning block 150 relative to the conductive ring, such as along an X-axis direction. For example, as the tuning block set 21A is moved towards a conductive ring along an X-axis direction, the resonant frequency may change (e.g. linearly with X-axis position) at a first rate as the first intersecting tuning block 150 is moved towards a distal end of the conductive ring. Once the first tuning block 150 of the tuning block set 21A has overlapped with the conductive ring and the second tuning block 150 of the tuning block set 21A has yet to contact the conductive ring, the resonant frequency may change at a second rate that is lower than the first rate as the tuning block set 21A is moved towards a distal end of the conductive ring.

Figure 10F:
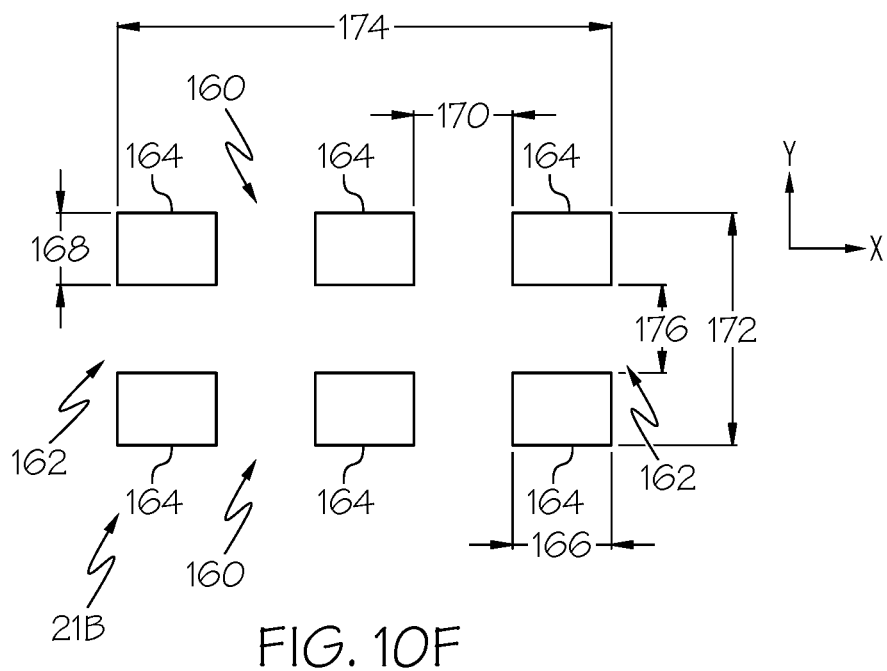

In some embodiments, such as in FIG. 10F, a tuning block set 21B may be composed of one or more tuning blocks 164, each having a height 168 and a width 166 that are the same or different lengths. In various embodiments, the tuning blocks 164 may be separated by a first distance 176 measured along a Y-axis and/or a second distance 170 measured along an X-axis. The first distance 176 may be greater than the second distance 170 or vice versa. The tuning block set 21B may have a width 172 and a length 174, with the length being equal to or greater than the width, or vice versa.

In various embodiments, the number of tuning blocks 164 in the tuning block set 21B may be between 1-2, 2-4, 4-6, 6-10, 10-15, 15-25, 25-50, 50-100, or greater. In various embodiments, one or more of the tuning blocks 164 may have a continuous surface within its outer boundaries or may partially or entirely be composed of surfaces having one or more holes, openings, or indentations. In some embodiments, one or more tuning blocks 164 and/or one or more of the gaps between the tuning blocks 164 or other components of the RFID device may be at least partially composed of mesh.

FIG. 11 illustrates a relationship between the position of the tuning block and the resonant frequency of the RFID device in accordance with some embodiments. For example, in the embodiment of FIG. 5, movement, positioning, and/or placement of the tuning block 20A at different locations may result in the graph of FIG. 11. As the tuning block 20A is moved and/or positioned with increasing coverage of a protrusion 62 of the conductive ring 16B, the increase in frequency relative to position along the X-axis may have a rate or angle of θ1. As the tuning block 20A is moved and/or positioned with increasing coverage of an indentation 64 of the conductive ring 16B, the increase in frequency relative to position along the X-axis may have a rate or angle of θ2. θ1 may be greater than θ2 by between 0-5, 5-20, 20-50, or 50-100 degrees.

Figure 12A:
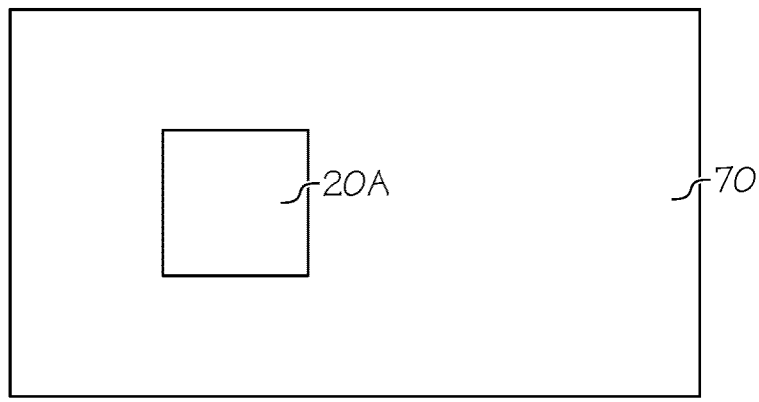
FIGS. 12A-12D illustrate a process of assembling an RFID device in accordance with some embodiments.
Figure 12B:
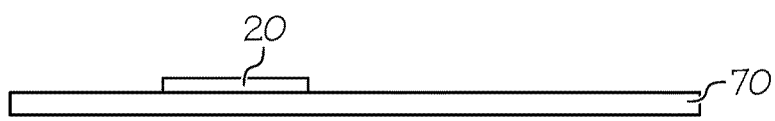

FIGS. 12A-12D illustrate a process of assembling an RFID device in accordance with some embodiments. FIG. 12A and FIG. 12B show a top view and a side view, respectively, illustrating a tuning block 20A attached to a substrate 70. In various embodiments, any of the tuning blocks 20A-H and/or tuning block units 21A-B may be used in combination with any of the components of FIGS. 1-13. For example, in some embodiments, a tuning block set 21A or 21B may be attached to the substrate 70.

Figure 12C:
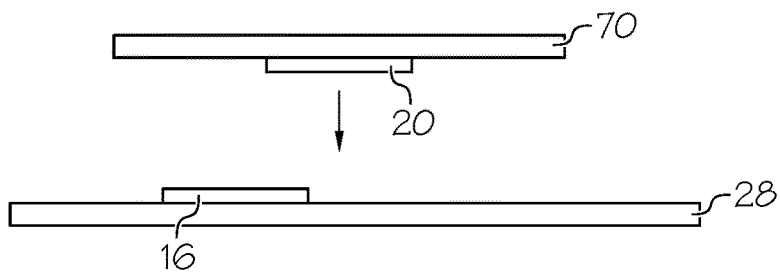
Figure 12D:
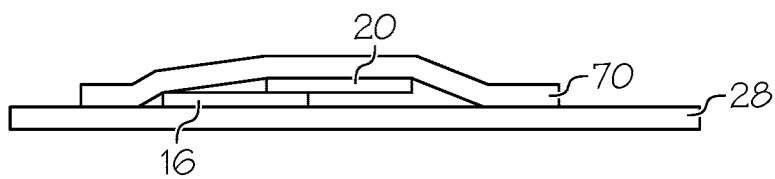

In some embodiments, such as in FIG. 12C the substrate 70 bearing one or more tuning blocks 20 (e.g., one or more of tuning blocks 20A-H) and/or tuning block units 21 (e.g., one or more of tuning block units 21A-B) may be aligned with an additional substrate 28 bearing at least a conductive ring 16 (e.g., one or more of 16A-E). At least part of the one or more tuning blocks 20 may be brought into contact with at least part of the conductive ring 16. The one tuning blocks 20 and the conductive ring 16 may be disposed between the substrate 70 and the substrate 28 as shown in FIG. 12D.

Figure 13:
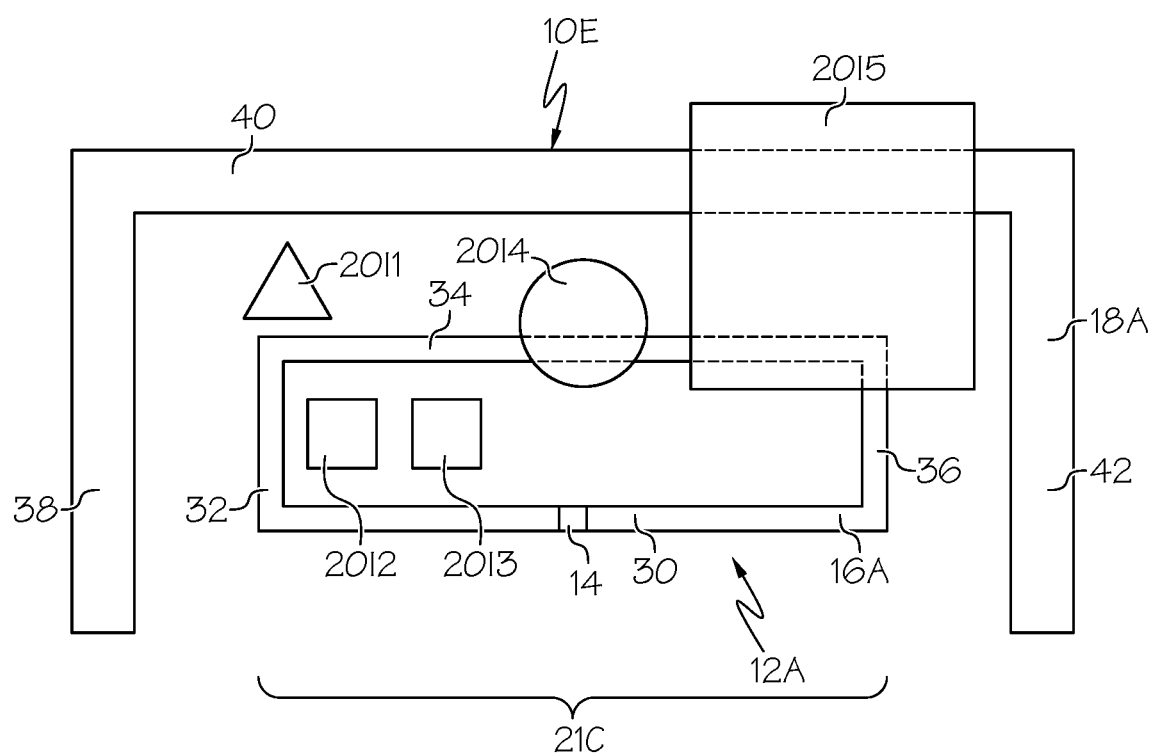
FIG. 13 illustrates a schematic view of components of an RFID device, in accordance with some embodiments.

FIG. 13 illustrates a schematic view of components of an RFID device, in accordance with some embodiments. In some embodiments, an RFID device 10 (e.g., RFID device 10A-F) includes one or more tuning blocks 20I1-20I5 that form a tuning block set 21C. The RFID device 10 may include one or more of a reactive strap 12A, a conductive ring 16A, an antenna 18A, a tuning block 20I1, a tuning block 20I2, a tuning block 20I3, a tuning block 20I4, a tuning block 20I5. The antenna 18A may include a first part 38, a second part 40, and a third part 42. The conductive ring 16A may include a first side 30, a second side 32, a third side 34, and a fourth side 36.

In some embodiments, one or more tuning blocks 20 (e.g., one or more or tuning blocks 20A-1) and/or part or all of a tuning block set 21 (e.g., one or more of tuning block set 21A-C) may be disposed within the inner boundaries of the conductive ring 16. In some embodiments, part or all of the one or more tuning blocks 20 and/or part or all of a tuning block set 21 may overlap with one or more of the conductive ring 16 and the antenna 18. In some embodiments, one or more tuning blocks 20 and/or part or all of a tuning block set 21 may be disposed between the first part 38 and the second side 32, between the second part 40 and the third side 34, between the third part 42 and the fourth side 36. In some embodiments, the conductive ring 16 may be disposed between the second part 40 and one or more tuning blocks 20 and/or part or all of a tuning block set 21. In some embodiments, part or all of the one or more tuning blocks 20 and/or part or all of a tuning block set 21 may be farther from the second part 40 than the conductive ring 16.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:
1. An RFID device, comprising:
a reactive strap including an RFID chip and a conductive ring connected to the RFID chip;
an antenna configured to be coupled to the reactive strap; and
a tuning block set positioned in the vicinity of the reactive strap, a resonant frequency of the RFID device being determined at least in part by at least one of the shape of the tuning block set and the position of the tuning block set relative to at least the reactive strap,
wherein the conductive ring and the tuning block set are configured such that there is a substantially linear relationship between positioning of the tuning block set with respect to the reactive strap and the change in the resonant frequency of the RFID device.
2. The RFID device of claim 1, wherein the tuning block set comprises one or more tuning blocks.
3. The RFID device of claim 1, further comprising a substrate that is attached to at least part of the reactive strap, the antenna, and the tuning block set.
4. The RFID device of claim 1, wherein the tuning block is at least partially formed of a metallic material, an inorganic compound material, and/or a ceramic material.
5. The RFID device of claim 1, wherein the tuning block set comprises a tuning block that has an at least substantially uniform dimension transverse to a direction in which the tuning block is configured to be moved with respect to the reactive strap.
6. The RFID device of claim 1, wherein the tuning block set comprises a tuning block that has a non-uniform dimension transverse to a direction in which the tuning block is configured to be moved with respect to the reactive strap.

7. The RFID device of claim 1, wherein the conductive ring and the tuning block set are configured such that there is a stepwise relationship between positioning of the tuning block set with respect to the reactive strap and the change in the resonant frequency of the RFID device.

8. The RFID device of claim 1, wherein the tuning block set is configured for positioning at locations varying in a plurality of axes with respect to the reactive strap.

9. The RFID device of claim 1, wherein the tuning block set does not overlap any portion of the antenna.

10. The RFID device of claim 1, wherein the tuning block set overlaps a portion of the antenna.

11. The RFID device of claim 1, wherein the antenna is configured as a monopole antenna.

12. The RFID device of claim 1, wherein the tuning block set has a variable size.

13. The RFID device of claim 1, wherein the tuning block set is configured to cause a change in the resonant frequency of the RFID device by overlapping a portion of the conductive ring.

14. The RFID device of claim 1, wherein the tuning block set is configured to cause a change in the resonant frequency of the RFID device without overlapping any portion of the conductive ring.

15. A method of forming a tuned RFID device, comprising:

placing a tuning block set with respect to a reactive strap of an RFID device to set a resonant frequency of the RFID device, wherein the RFID device comprises an antenna and the reactive strap including an RFID chip and a conductive ring connected to the RFID chip; and fixing a position of the tuning block set with respect to the reactive strap to define the resonant frequency of the RFID device, wherein the conductive ring and the tuning block set are configured such that there is a substantially linear relationship between positioning of the tuning block set with respect to the reactive strap and the change in the resonant frequency of the RFID device.

16. The method of claim 15, wherein the tuning block set comprises one or more tuning blocks.

17. The method of claim 15, wherein the RFID device further comprises a substrate that is attached to at least part of the reactive strap, the antenna, and the tuning block set.

18. The method of claim 15, wherein placing the tuning block set with respect to the reactive strap includes causing a portion of the tuning block set to overlap a portion of the conductive ring.

19. The method of claim 15, wherein placing the tuning block set with respect to the reactive strap includes preventing the tuning block set from overlapping any portion of the conductive ring.

* * * * *